US 9,436,946 B2

(12) United States Patent
Collins et al.

(10) Patent No.: US 9,436,946 B2
(45) Date of Patent: Sep. 6, 2016

(54) SELECTING CONTENT BASED ON ENTITIES PRESENT IN SEARCH RESULTS

(71) Applicant: Google Inc., Mountain View, CA (US)

(72) Inventors: Alexander Collins, Denver, CO (US); Andrew T. Wansley, San Francisco, CA (US)

(73) Assignee: Google Inc., Mountain View, CA (US)

( * ) Notice: Subject to any disclaimer, the term of this patent is extended or adjusted under 35 U.S.C. 154(b) by 206 days.

(21) Appl. No.: 13/955,280

(22) Filed: Jul. 31, 2013

(65) Prior Publication Data

US 2015/0039589 A1    Feb. 5, 2015

(51) Int. Cl.
*G06Q 30/02* (2012.01)
*G06F 17/30* (2006.01)

(52) U.S. Cl.
CPC ......... *G06Q 30/02* (2013.01); *G06F 17/30867* (2013.01)

(58) Field of Classification Search
CPC ..................... G06F 17/3005; G06F 17/30112; G06F 17/30126; G06F 17/30457; G06F 17/30554; G06F 17/30696; G06F 17/30769; G06F 17/30837; G06F 17/30029; G06F 17/30699; G06F 17/30761; G06F 17/30828; G06F 17/30867; G06Q 30/02
USPC ........................................................ 707/722
See application file for complete search history.

(56) References Cited

U.S. PATENT DOCUMENTS

| | | | |
|---|---|---|---|
| 7,831,685 B2 | 11/2010 | Dai et al. | |
| 7,849,104 B2 | 12/2010 | Sun et al. | |
| 7,987,194 B1 | 7/2011 | Walker et al. | |
| 8,122,016 B1 | 2/2012 | Lamba et al. | |
| 8,171,021 B2 | 5/2012 | Guha et al. | |
| 8,364,525 B2 | 1/2013 | Kothiwal et al. | |
| 8,989,718 B2 * | 3/2015 | Ramer et al. | 455/414.4 |
| 2006/0004732 A1 | 1/2006 | Odom | |
| 2006/0206479 A1 | 9/2006 | Mason | |
| 2008/0214148 A1 * | 9/2008 | Ramer et al. | 455/414.1 |
| 2008/0214152 A1 * | 9/2008 | Ramer et al. | 455/414.1 |
| 2010/0063877 A1 * | 3/2010 | Soroca et al. | 705/14.45 |
| 2010/0094878 A1 * | 4/2010 | Soroca et al. | 707/748 |
| 2010/0287048 A1 * | 11/2010 | Ramer et al. | 705/14.46 |
| 2011/0177799 A1 * | 7/2011 | Ramer et al. | 455/414.1 |
| 2011/0258049 A1 * | 10/2011 | Ramer et al. | 705/14.66 |

(Continued)

FOREIGN PATENT DOCUMENTS

EP        1589443 A2    10/2005

OTHER PUBLICATIONS

Broder et al., "Search Advertising using Web Relevance Feedback," ACM 2008, 1013-1022.

(Continued)

*Primary Examiner* — Syed Hasan
*Assistant Examiner* — Saba Ahmed
(74) *Attorney, Agent, or Firm* — Fish & Richardson P.C.

(57) ABSTRACT

Methods, systems, and apparatus include computer programs encoded on a computer-readable storage medium for providing content to a user. A method includes: receiving a query; receiving query results based on the query; determining for each of a predetermined number of top results entities associated therewith; using the determined entities to either augment or filter the query producing an enhanced query; and using the enhanced query to identify one or more sponsored content items for presentation to a user along with the query results.

9 Claims, 5 Drawing Sheets

(56) References Cited

U.S. PATENT DOCUMENTS

| | | |
|---|---|---|
| 2011/0313853 A1* | 12/2011 | Ramer et al. .............. 705/14.46 |
| 2012/0089996 A1* | 4/2012 | Ramer et al. ................... 725/14 |
| 2013/0018723 A1 | 1/2013 | Khanna |
| 2013/0091013 A1 | 4/2013 | Wang et al. |

OTHER PUBLICATIONS

Joshi et al., "Contextual Advertising through Entity Extraction ," International Journal of Engineering and Advanced Technology (IJEAT) 2(3):2249-8958, Feb. 2013.

* cited by examiner

SELECTING CONTENT BASED ON ENTITIES PRESENT IN SEARCH RESULTS

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for providing content to a user. A method comprises: receiving a query; receiving query results based on the query; determining for each of a predetermined number of top results entities associated therewith; using the determined entities to either augment or filter the query producing an enhanced query; and using the enhanced query to identify one or more sponsored content items for presentation to a user along with the query results.

In general, another aspect of the subject matter described in this specification can be implemented in computer program products. A computer program product is tangibly embodied in a computer-readable storage device and comprises instructions. The instructions, when executed by a processor, cause the processor to: receive a query; receive query results based on the query; determine for each of a predetermined number of top results entities associated therewith; use the determined entities to either augment or filter the query producing an enhanced query; and use the enhanced query to identify one or more sponsored content items for presentation to a user along with the query results.

In general, another aspect of the subject matter described in this specification can be implemented in systems. A system includes a query enhancer and a content selector. The query enhancer is configured to: receive a query; receive query results based on the query; determine for each of a predetermined number of top results entities associated therewith; and use the determined entities to either augment or filter the query producing an enhanced query. The content selector is configured to use the enhanced query to identify one or more sponsored content items for presentation to a user along with the query results.

These and other implementations can each optionally include one or more of the following features. Receiving the query can include receiving an explicit query from a user or an implicit query generated by a content delivery system. The predetermined number of top results can be determined based on a display environment for presenting query results to the user. Determining entities for a top result can include determining a predetermined number of entities for each top result. The entities associated with the top result can be filtered to produce a filtered set of entities. Using the determined entities can include using only the filtered set of entities to augment or filter the query. Augmenting the query can include adding one or more of the entities of the determined entities to the query prior to using the enhanced query to determine the one or more sponsored content items. Filtering the query can include removing an entity that is explicitly included in the query prior to using the enhanced query to determine the one or more sponsored content items. Determining one or more sponsored content items can include determining one or more advertisements that are targeted to an entity in the determined entities. The query results can be of the form of suggestions that are made responsive to the query being entered and prior to the submission of the query to a search service. The one or more sponsored content items can include sponsored content items for presentation along with a resource associated with a selected suggestion. The query can be an implicit query and can result in presentation of query results to the user without the user explicitly providing the query.

Particular implementations may realize none, one or more of the following advantages. Content that is relevant to entities included in query results can be presented along with the query results. Content that is more relevant to entities associated with query results for a query than to entities associated with the query can be presented along with the query results.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A query and query results, such as a predetermined number of top query results, can be identified. One or more entities can be determined for each of the top query results. The determined entities can be used to either augment or filter the query to produce an enhanced query. The enhanced query can be used to determine one or more content items to present to a user along with search results that are responsive to the query.

For situations in which the systems discussed here collect information about users, or may make use of information about users, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be manipulated in one or more ways before it is stored or used, so that certain information about the user is removed. For example, a user's identity may be manipulated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
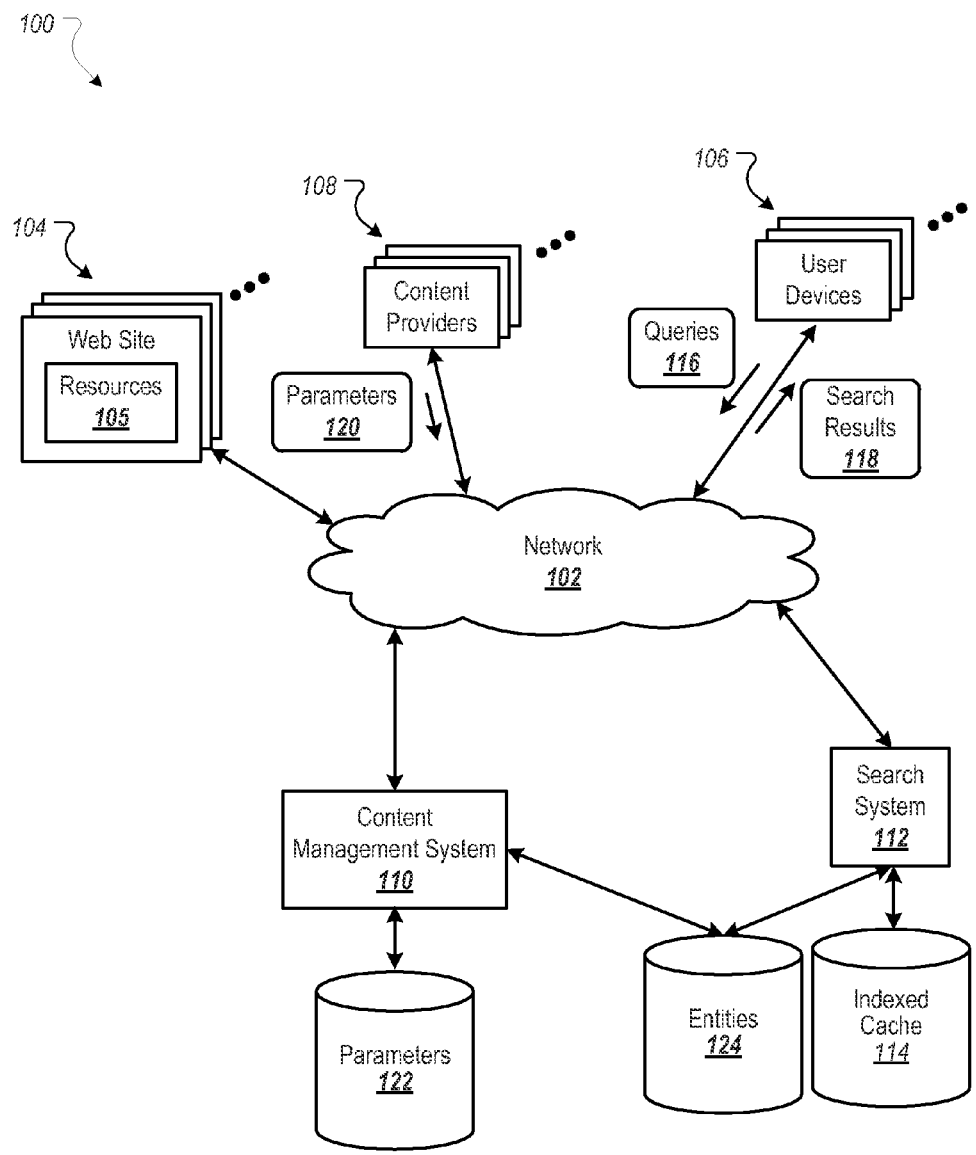
FIG. 1 is a block diagram of an example environment for providing content to a user.

FIG. 1 is a block diagram of an example environment 100 for providing content to a user. The example environment 100 includes a network 102, such as a local area network (LAN), a wide area network (WAN), the Internet, or a combination thereof. The network 102 connects websites 104, user devices 106, content providers 108, publishers, and a content management system 110. The example environment 100 may include many thousands of websites 104, user devices 106, and content providers 108. The content management system 110 may be used for selecting and providing content in response to requests for content. The content providers 108 can be, for example, advertisers. Other types of content providers are possible.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, videos, images and sounds, that may include embedded information (such as meta-information hyperlinks) and/or embedded instructions (such as scripts).

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. User devices 106 can also submit search queries 116 to the search system 112 over the network 102. In response to a search query 116, the search system 112 can, for example, access the indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The data representing the resource 105 or the search results 118 can also include data specifying a portion of the resource 105 or search results 118 or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource ("resource keywords") or a search query 116 for which search results 118 are requested can also be provided to the content management system 110 to facilitate identification of content that is relevant to the resource or search query 116.

Based, for example, on data included in the request for content, the content management system 110 can select content items that are eligible to be provided in response to the request, such as content items having characteristics matching the characteristics of a given slot. As another example, content items having selection criteria (e.g., keywords) that match the resource keywords or the search query 116 may be selected as eligible content items by the content management system 110. One or more selected content items can be provided to the user device 106 in association with providing an associated resource 105 or search results 118.

The content management system 110 can select content in response to the request for content based at least in part on one or more entities that appear in the search results 118. In general, an entity can be named and can represent, for example, a person (e.g., celebrity, president), place (e.g., national park, city), thing (e.g., ice cream, sweater), or concept (e.g., biology, motherhood). A group or category of entities can be considered to be an entity (e.g., baseball players). Other examples of entities include a product, a product category, a product manufacturer, a specific model of a product, a service, a service category, an organization, a vertical, a user intent or interest associated with a product or a service, a user activity, or an abstract idea.

The search system 112 or the content management system 110 can, for example, identify entities that are associated with a predetermined number (e.g., three, ten) of top search results 118. The search system 112 or the content management system 110 can identify entities based on entity data from an entity data store 124. The entity data store 124 can include identifiers, definitions and other information about entities. Entity definition information can be used for identifying entities associated with a particular top search result. For example, data in the entity data store 124 can include keywords or other information associated with each entity that can be used by the search system 112 or the content management system 110 for identifying entities associated with a particular top search result. Entities and entity definitions can be hierarchical, meaning that one entity (e.g., cameras) can include other sub-entities (e.g., land cameras and digital cameras). Other relationships among entities can exist.

The content management system 110 or the search system 112 can use the determined entities to augment and/or filter the search query 116 to produce an enhanced query. Augmenting the search query 116 can include, for example, adding one or more of the determined entities to the search query 116. Filtering the search query 116 can include, for example, removing an entity that is explicitly included in the search query 116. The content management system 110 can determine one or more content items in response to the request for content based on the enhanced query. The determined one or more content items can be provided to the requesting user device 106, for presentation on the user device 106.

In some implementations, the content management system 110 can select content items based at least in part on results of an auction. For example, content providers 108 can provide bids specifying amounts that the content providers 108 are respectively willing to pay for presentation of their content items. In turn, an auction can be performed and the slots can be allocated to content providers 108 according, among other things, to their bids and/or the relevance of a content item to content presented on a page hosting the slot or a request that is received for the content item. For example, when a slot is being allocated in an auction, the slot can be allocated to the content provider 108 that provided the highest bid or a highest auction score (e.g., a score that is computed as a function of a bid and/or a quality measure). When multiple slots are allocated in a single auction, the slots can be allocated to a set of bidders that provided the highest bids or have the highest auction scores.

A content provider 108 or content sponsor can create a content campaign associated with one or more content items using tools provided by the content management system 110. For example, the content management system 110 can provide one or more account management user interfaces for creating and managing content campaigns. The account management user interfaces can be made available to the content provider 108, for example, either through an online interface provided by the content management system 110 or as an account management software application installed and executed locally at a content provider's client device.

A content provider 108 can, using the account management user interfaces, provide campaign parameters 120 which define a content campaign. The content campaign can be created and activated for the content provider 108 according to the parameters 120 specified by the content provider 108. The campaign parameters 120 can be stored in a parameters data store 122. Campaign parameters 120 can include, for example, a campaign name, a preferred content network for placing content, a budget for the campaign, start and end dates for the campaign, a schedule for content placements, content (e.g., creatives), bids, and selection criteria. Selection criteria can include, for example, a language, one or more geographical locations or websites, and/or one or more selection terms. As another example, a content provider 108 can designate one or more entities to be used as selection criteria or can annotate an otherwise described selection criteria or a bid with one or more entities. For example, a content provider 108 can specify that a bid associated with a particular keyword is to be adjusted (e.g., increased) if a query is related to a particular entity as well as to the keyword.

Figure 2:
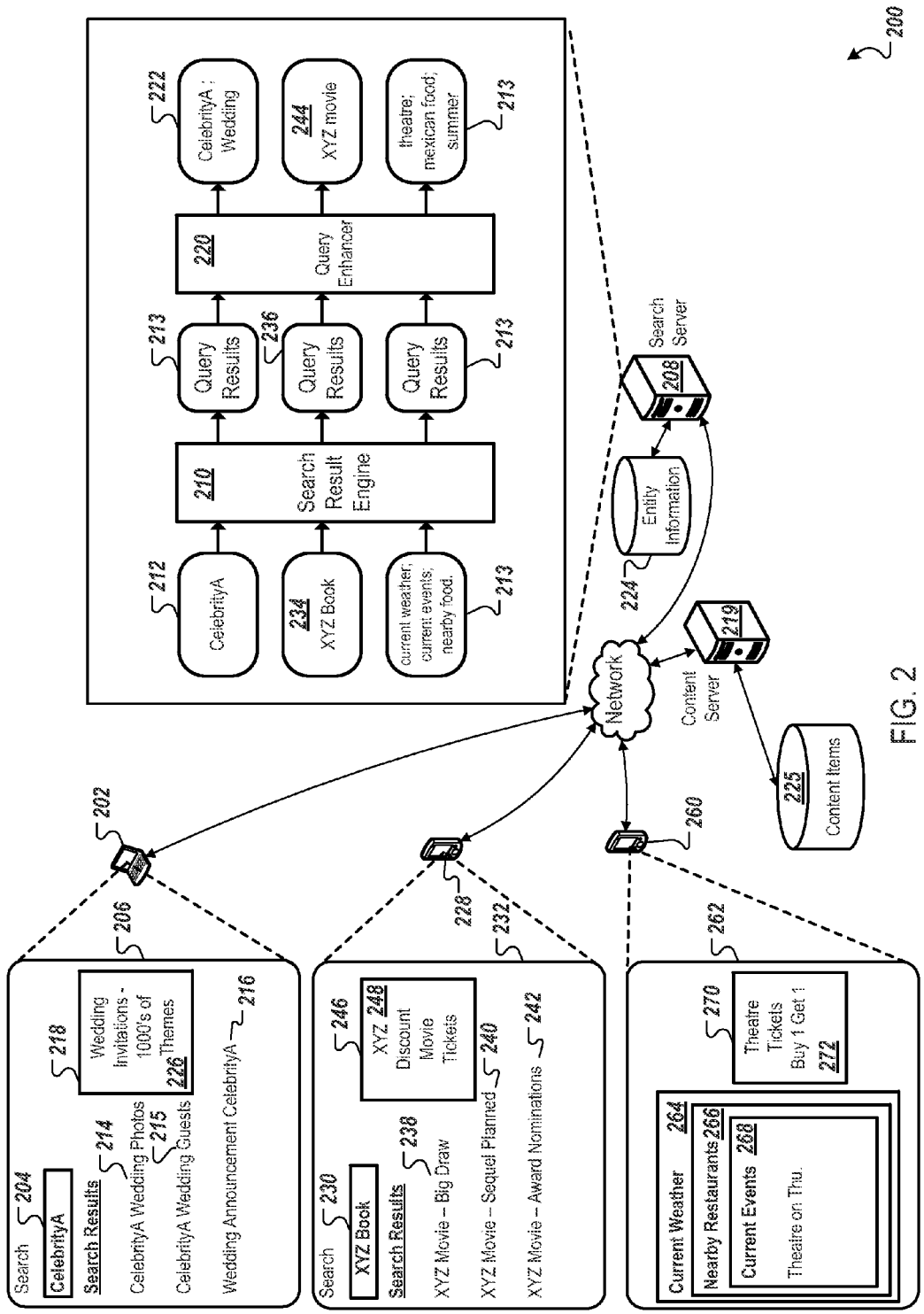
FIG. 2 is a block diagram of an example system for providing content to a user.

FIG. 2 is a block diagram of an example system 200 for providing content to a user. A user of a user device 202 can enter a search query 204 of "CelebrityA" using a user interface 206. The search query 204 can be sent to a search server 208. The search query 204 can be provided as an input to a search result engine 210 of the search server 208, as illustrated by a search query input 212. The search result engine 210 can generate a set of query results (e.g., search results) 213 for the search query input 212. The query results 213 can be provided to and presented on the user interface 206, as illustrated by query results 214, 215, and 216.

In association with the sending of the search query 204, a request for content for a content slot 218 can be sent to the content server 209. Content can be determined, for example, based at least in part on an enhanced query that is produced based on the search query input 212 and the query results 213. For example, a query enhancer 220 can produce an enhanced query 222 based on entities that are determined from the search results 213, using entity information included in an entity datastore 224. The enhanced query is itself not used in determining search results, rather only used in determining additional content that is to be provided along with the search results that are organically derived from the original search results.

For example, the query enhancer 220 can identify a top number (e.g., three, ten) of the query results 213. The query enhancer 220 can determine, for each of the top query results, a set of entities that are associated with each top query result. For example, the query enhancer 220 can identify the query results 214, 215, and 216 as top query results and can determine entities "CelebrityA", "wedding", "pictures" and "wedding pictures" from the query result 214, entities "CelebrityA", "wedding", and "wedding guests" from the query result 215, and entities "CelebrityA", "wedding", and "wedding announcement" from the query result 216.

The query enhancer 220 can aggregate the entities determined across all of the identified top query results and can determine a set of top entities for the top query results. For example, the query enhancer 220 can identify a top N (e.g., five) entities associated with the top query results, based, for example, on the total number of occurrences of each determined entity in the top query results. As another example, the query enhancer 220 can determine a set of top entities by determining which entities appear at least M (e.g., three, five, ten) times in the top query results. For the query results 213, the query enhancer 220 can determine, for example, top entities of "CelebrityA" and "wedding". The query enhancer 220 can augment the search query input 212 by adding the "wedding" entity to the search query input 212, to create the enhanced query 222.

The enhanced query 222 can be provided to the content server 219 and the content server 219 can select a content item for the content slot 218 from a content datastore 225, based at least in part on the enhanced query 222. For example, the content server 219 can select a content item that is associated with one or more keywords that match the enhanced query 222. The selected content item can be provided to the user device 202 and displayed in the content slot 218, as illustrated by a content item 226.

As another example, a user of a user device 228 can enter a search query 230 of "XYZ book" using a user interface 232. The search query 230 can be sent to the search server 208 and provided as an input to the search result engine 210, as illustrated by a search query input 234. The search result engine 210 can generate a set of query results 236 for the search query input 234. The query results 236 can be provided to and presented on the user interface 232, as illustrated by query results 238, 240, and 242.

In association with the sending of the search query 230, a request for content for a content slot 246 can be sent to the content server 209. The query enhancer 220 can identify a top number of the query results 236 and can determine, for each of the top query results, a set of entities that are associated with each top query result. For example, the query enhancer 220 can identify the query results 238, 240, and 242 as top query results and can determine entities "XYZ movie", "movie", and "attendance" from the query result 238, entities "XYZ movie", "movie", and "sequel" from the query result 240, and entities "XYZ movie", "movie", and "awards" from the query result 242.

The query enhancer 220 can determine, for example, top entities of "XYZ movie" and "movie" from the top query results. The query enhancer 220 can augment the search query input 234 by adding the "XYZ movie" entity to the search query input 234. The query enhancer 220 can filter the search query input 234 by removing the "XYZ book" entity from the search query input 234, based on the "XYZ book" entity not appearing in the determined top entities. The augmenting and the filtering of the search query input 234 can produce an enhanced query 244. The enhanced query 244 can be provided to the content server 219 and the content server 219 can select a content item for the content slot 246, based at least in part on the enhanced query 244. The selected content item can be provided to the user device 228 and displayed in the content slot 246, as illustrated by a content item 248.

Augmenting or filtering a query prior to determining content in response to a request for content for a content slot presented on a query results (e.g., search results) page can result in selection of a content item that is more relevant to the presented query results than if the content is selected based on the original query. For example, the query results 214, 215, and 216 indicate that users who enter the query 204 of "CelebrityA" have recently been interested in a wedding of "CelebrityA" and therefore may be interested in the topic of weddings in general, as well as in the topic of "CelebrityA". Accordingly, using an enhanced query 222 of "'CelebrityA'; 'wedding'" may result in selection of content of interest to users who enter the search query 204. As another example, the query results 238, 240, and 242 indicate that users who enter the query 230 of "XYZ book" may actually be more interested in the "XYZ movie" entity than in the "XYZ book" entity, so filtering the search query input 234 to not include the "XYZ book" entity (e.g., in the generation of the enhanced query 244) can result in selection of content that more closely matches the interest of such users as compared to selecting content based on the original query 230.

In some implementations, a query received by the search server 208, the content server 219, or some other information server can be an implicit query which results in presentation of query results to the user without the user explicitly providing the query. For example, an implicit query can be sent by a user device 260, such as on a periodic basis (e.g., every hour), according to some other schedule (e.g., every day at 9 a.m. and 3 p.m.), or in response to some event, such as a detection of a change in location of the user device 260.

The implicit query can be a query to retrieve information that may be of interest to the user. For example, the implicit query can be a query to retrieve information relating to the current weather for the location of the user device 260, information about nearby attractions, or information about events taking place near the user at the current time or within a threshold amount of time (e.g., four hours) of the current time. In response to the implicit query, information to satisfy the implicit query can be determined and provided to the user device 260, for presentation on the user device 260. For example, as shown in a user interface 262, a current weather information result 264, a nearby restaurants information result 266, and a current events information result 268 are displayed.

In association with the implicit query, a request for content for a content slot 270 can be sent to the content server 209. The query enhancer 220 can identify one or more entities for each of the information results 264, 266, and 268. For example, an entity of "theatre" can be identified. The implicit query and the identified one or more entities can be provided to the content server 219, and the content server 219 can select a content item for the content slot 270 based on the implicit query and on the identified one or more entities. The selected content item can be provided to the user device 260, for presentation on the user device 260, as illustrated by a content item 272.

Figure 3:
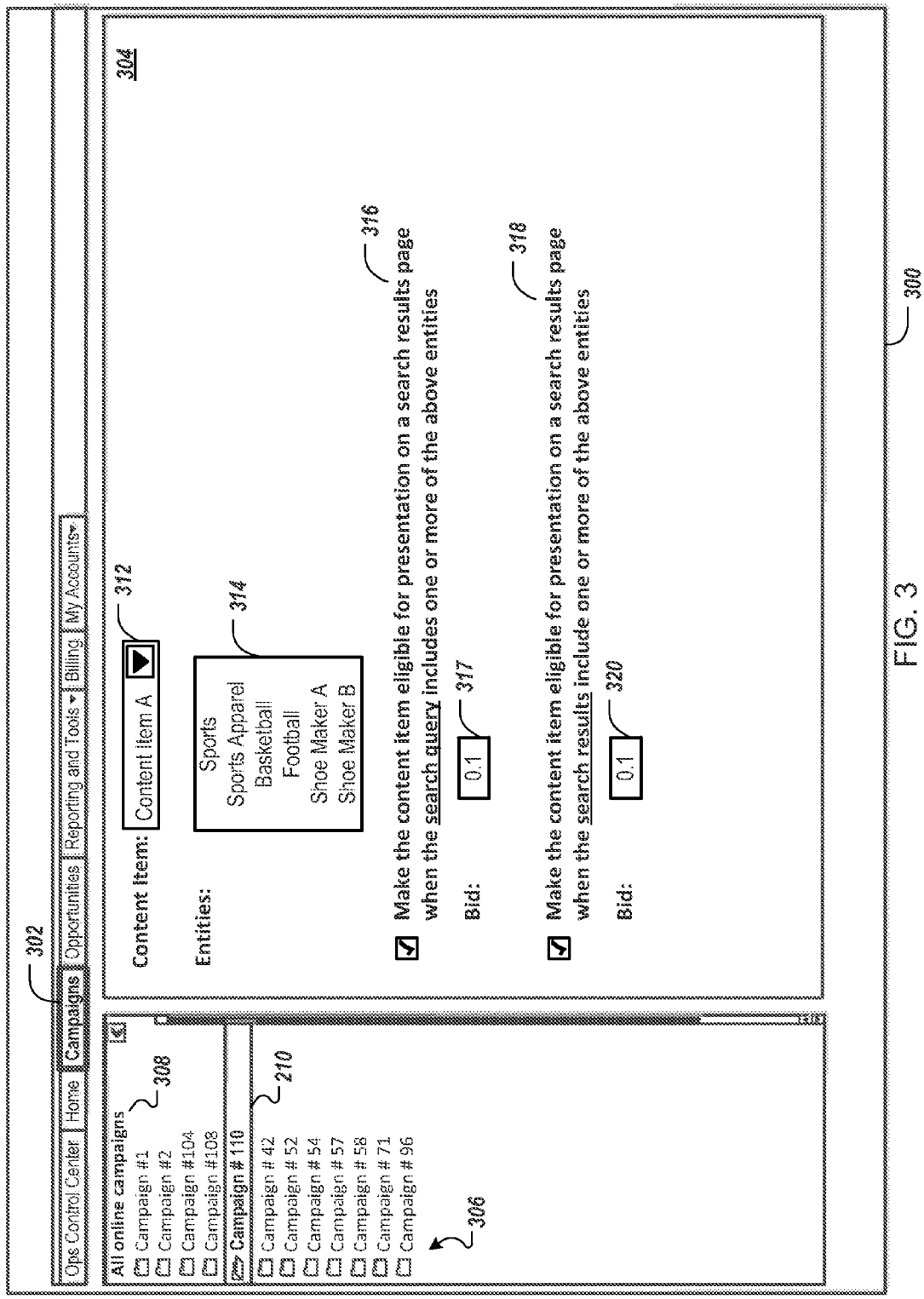
FIG. 3 illustrates an example campaign management user interface.

FIG. 3 illustrates an example campaign management user interface 300. The user interface 300 can be included, for example, in one or more user interfaces that a user, such as a content item provider or content sponsor, can use to configure a campaign. The content item provider can select a tab 302 to display a campaign configuration area 304. The content item provider can view a list 306 of campaigns by selecting a control 308. The content item provider can edit an existing campaign in the campaign configuration area 304 by selecting the name of an existing campaign (e.g., a name 310) in the campaign list 306. The content item provider can select a content item associated with the campaign using a control 312.

A control 314 lists entities that are associated with the selected content item and/or with the content item provider. The content item provider can provide (e.g., enter) some or all of the entities using the control 314. As another example, some or all of the entities in the control 314 can be automatically determined and suggested to the content item provider. For example, some or all of the entities in the control 314 can be automatically determined from one or more web pages that are associated with a web site of the content item provider or from other information provided by or otherwise associated with the content item provider. Some or all of the entities in the control 314 can be determined based on the content of the selected content item.

The content item provider can select a control 316 to configure selection criteria that indicates that the selected content item is to be eligible for presentation on a search results page when a search query includes one or more of the entities in the control 314. A bid associated with the selection criteria associated with the control 316 can be configured using a control 317. The content item provider can select a control 318 to configure selection criteria that indicates that the selected content item is to be eligible for presentation on a search results page when one or more top search results includes one or more of the entities in the control 314. A bid associated with the selection criteria associated with the control 318 can be configured using a control 320.

Figure 4:
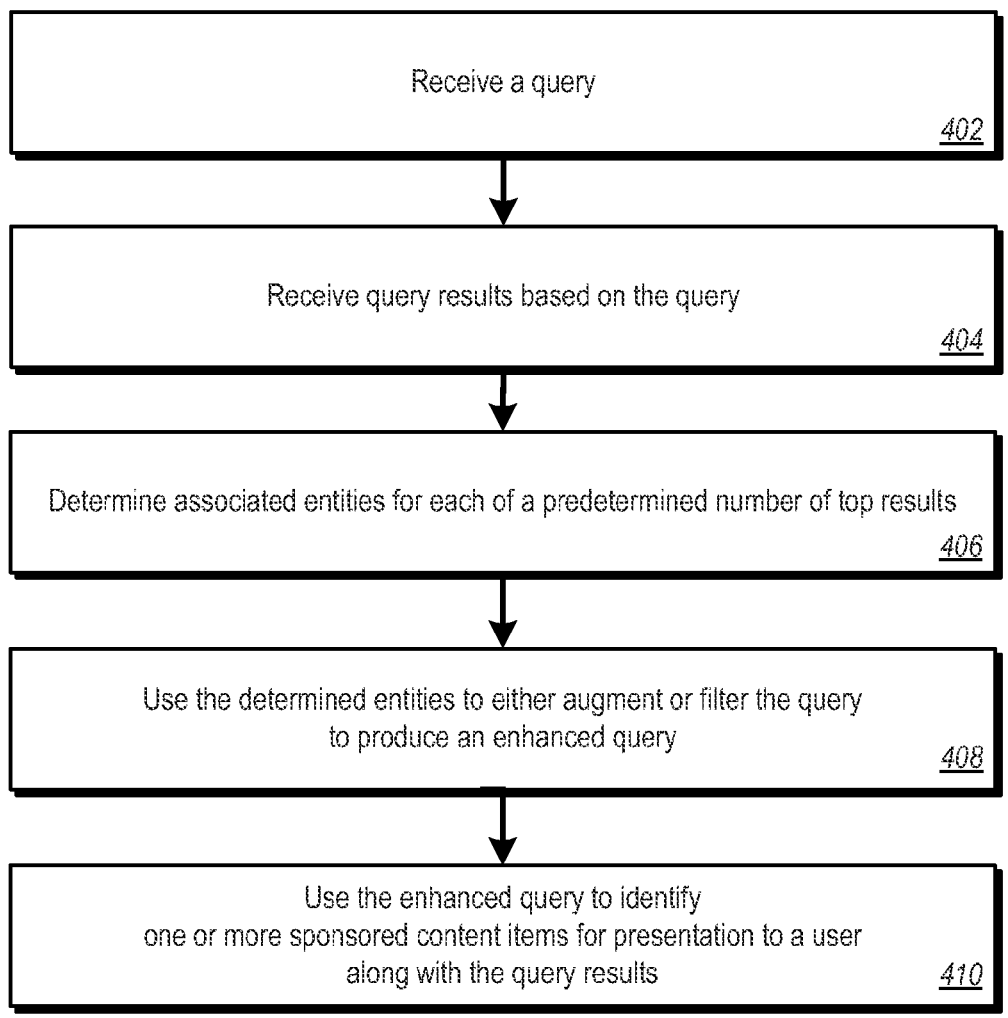
FIG. 4 is a flowchart of an example process for providing content to a user.

FIG. 4 is a flowchart of an example process 400 for providing content to a user. The process 400 can be performed, for example, by the content management system 110 and/or the search system 112 described above with respect to FIG. 1, or the content server 219 and/or the search server 208 described above with respect to FIG. 2.

A query is received (402). The query can be, for example, a search query. The query can be received from a search system. The query can be an explicit query provided by a user or an implicit query generated by a content delivery system. When the query is an implicit query, query results are presented to the user without the user explicitly providing the query.

Query results based on the query are received (404). The query results can be received, for example, from a search engine or a search service. In some implementations, the system can use suggestions rather than actual search results, such as suggestions to queries that are entered/received. The suggestions can be presented to the user prior to the submission of the query to the search engine or search service and the entity determination can be made based on the suggestions.

One or more associated entities are determined for each of a predetermined number of top results (406). In some implementations, the predetermined number of top results is determined based on a display environment for presenting search results to the user. For example, when the display environment is a mobile device, the predetermined number of top results can be three and when the display environment is a desktop computing device, the predetermined number of top results can be ten.

In general, an entity can be named and can represent, for example, a person (e.g., celebrity, president), place (e.g., national park, city), thing (e.g., ice cream, sweater), or concept (e.g., biology, motherhood). A group or category of entities can be considered to be an entity (e.g., baseball players). Other examples of entities include a product, a product category, a product manufacturer, a specific model of a product, a service, a service category, an organization, a vertical, a user intent or interest associated with a product or a service, a user activity, or an abstract idea.

In some implementations, the top results are processed to determine the associated entities. In some implementations, the entities are determined by looking up the query in a cache of pre-computed query-entity associations. The query-entity associations can be pre-computed, for example, on a periodic basis (e.g., weekly) for a predetermined number (e.g., 100,000) of the most popular queries. If the query is located in the query-entity associations cache, the entities associated with the query can be retrieved from the cache. If the query is not located in the query-entity associations cache, the top results can be processed to identify entities associated with the top results.

When the top results are suggestions, one or more entities can be determined from each suggestion. In some implementations, up to a predetermined number (e.g., three, five) of entities are determined for each top result. The entities determined across all of the top results can be aggregated and set of top entities for the top results can be determined. For example, a top N (e.g., five) entities associated with the top results can be identified, based on the total number of occurrences of each determined entity in the top results. In other examples, a set of top entities can be determined by determining which entities appear at least M (e.g., three, five, ten) times in the top results or by determining which entities appear in a threshold percentage (e.g., seventy five percent) of the top results.

In some implementations, other approaches can be used to filter the entities associated with the top results. For example, a topical score can be determined for each entity associated with a particular top result and a filtered set of entities can be determined where each of the filtered entities has a topical score that is greater than a threshold. A topical score can indicate, for example, a relevance of the entity to a particular top result or to a resource associated with the top result.

The determined entities are used to either augment or filter the query to produce an enhanced query (408). When the entities associated with the top results are filtered, the filtered set of entities can be used to produce the enhanced query. Augmenting the query can include adding one or more of the entities of the determined entities to the query. Filtering the query can include removing an entity that is explicitly included in the query. In some implementations and for some queries, both augmenting and filtering can be performed. For example, one or more entities may be removed from the query and one or more other entities may be added to the query.

In some implementations, rather than remove an entity from the query, a weight which downgrades the importance of the entity can be assigned to the entity. For example, when an entity in the query does not appear at all in the top results or appears less than a first threshold number of times (e.g., two) in the top results, the entity can be removed from the query. When an entity in the query appears more than the first threshold number of times in the top results but less than a second threshold number of times (e.g., five), a weight that downgrades the importance of the entity can be assigned to the entity. When an entity in the query appears at least the second threshold number of times in the top results, the entity can be maintained (e.g., not removed or downgraded) in the query.

The enhanced query is used to identify one or more sponsored content items for presentation to a user along with the query results (410). For example, one or more sponsored content items that are associated with one or more keywords that match the enhanced query can be determined. When the query results are in the form of suggestions, the search results can be responsive to a selected suggestion. The search results and the one or more determined sponsored content items can be provided to a user device, for presentation on the user device.

Figure 5:
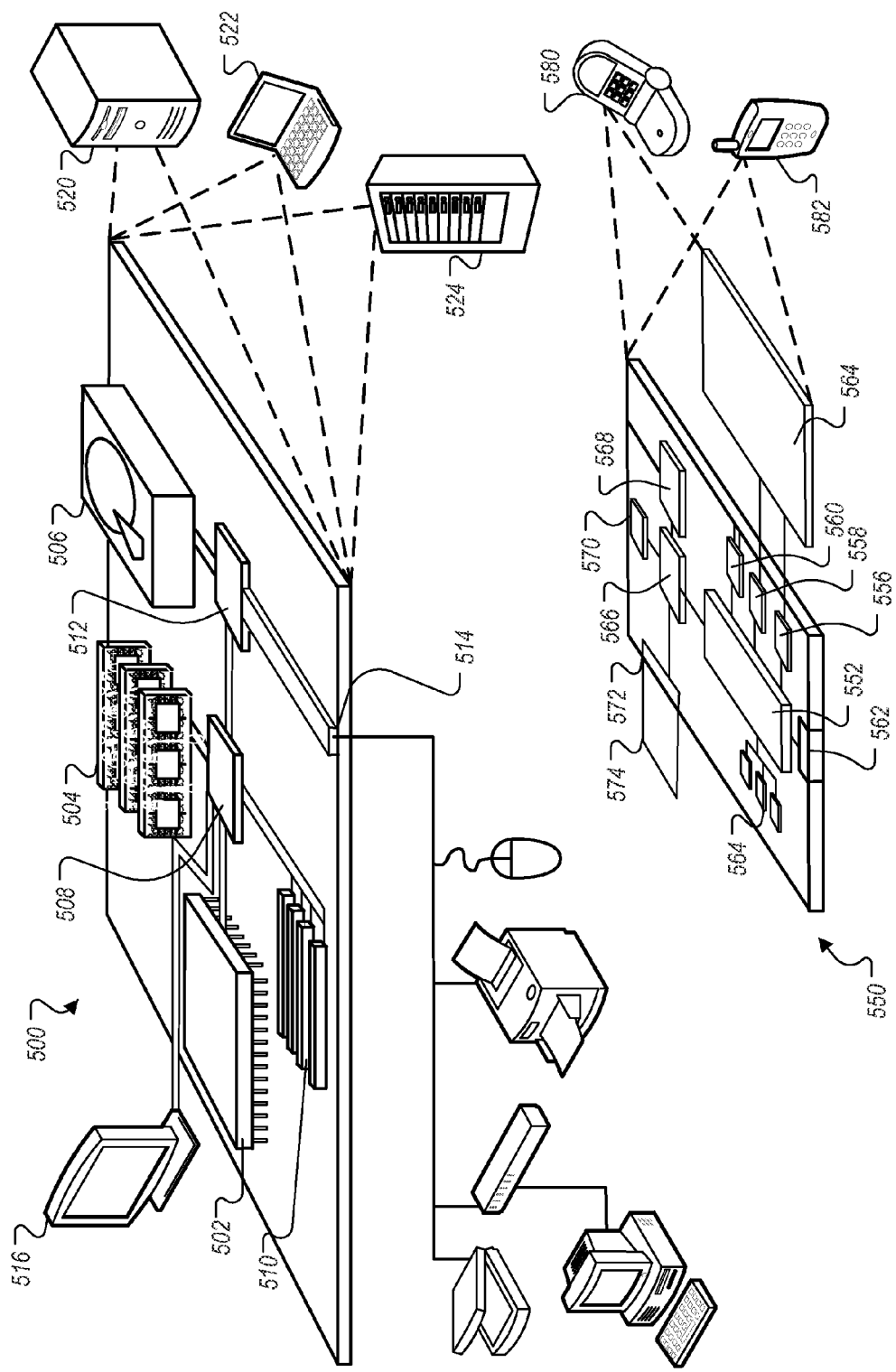
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. The computer-readable medium is not a propagating signal. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is illustrative only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
    receiving a query submitted from a user device;
    receiving a set of query results identified using the query;
    prior to presentation of the set of query results:
        evaluating, by one or more processors, the set of query results to identify an entity that appears in a highest number of query results in the set of query results, wherein an entity is named and represents a person, place, thing or concept;
        creating an enhanced query that includes a reference to the identified entity, and omits at least one term from the query;
        using the enhanced query to identify one or more sponsored content items for presentation with the set of query results; and
    incorporating the one or more sponsored content items into a search results page that presents the set of query results.

2. The method of claim 1 wherein receiving the query includes receiving an explicit query from a user or an implicit query generated by a content delivery system.

3. The method of claim 1 wherein determining one or more sponsored content items includes determining one or more advertisements that are targeted to the entity.

4. The method of claim 1 wherein the query results are of the form of suggestions that are made responsive to the query being entered and prior to the submission of the query to a search service and wherein the one or more sponsored content items include sponsored content items for presentation along with a resource associated with a selected suggestion.

5. The method of claim 1 wherein the query is an implicit query and results in presentation of query results to the user without the user explicitly providing the query.

6. A computer program product tangibly embodied in a computer readable storage device and comprising instructions that, when executed by a processor, cause the processor to:
    receive a query submitted from a user device;
    receive a set of query results identified using the query;

prior to presentation of the set of query results:
> evaluate, by one or more processors, the set of query results to identify an entity that appears in a highest number of query results in the set of query results, wherein an entity is named and represents a person, place, thing or concept;
>
> create an enhanced query that includes a reference to the identified entity, and omits at least one term from the query;
>
> use the enhanced query to identify one or more sponsored content items for presentation with the set of query results; and
>
> incorporate the one or more sponsored content items into a search results page that presents the set of query results.

7. The product of claim 6 wherein receiving the query includes receiving an explicit query from a user or an implicit query generated by a content delivery system.

8. A system comprising:
a query enhancer;
a content selector; and
wherein the query enhancer is configured to:
> receive a query submitted from a user device;
> receive a set of query results identified using the query;
> prior to presentation of the set of query results:
>> evaluate, by one or more processors, the set of query results to identify an entity that appears in a highest number of query results in the set of query results, wherein an entity is named and represents a person, place, thing or concept; and
>>
>> create an enhanced query that includes a reference to the identified entity, and omits at least one term from the query; and
>
> wherein the content selector is configured to:
>> use the enhanced query to identify one or more sponsored content items for presentation with the set of query results; and
>>
>> incorporate the one or more sponsored content items into a search results page that presents the set of query results.

9. The system of claim 8 wherein receiving the query includes receiving an explicit query from a user or an implicit query generated by a content delivery system.

* * * * *